United States Patent [19]

Fluet

[11] 3,939,330
[45] Feb. 17, 1976

[54] VECTOR CONVERSION SYSTEM

[75] Inventor: Francis A. Fluet, Clarence, N.Y.

[73] Assignee: Westinghouse Electric Corporation, Pittsburgh, PA

[22] Filed: Oct. 10, 1974

[21] Appl. No.: 513,915

[52] U.S. Cl. ............ 235/151.11; 235/186; 318/572
[51] Int. Cl.² .................. G05B 19/18; G06F 15/46
[58] Field of Search............. 235/151.11, 186, 189; 444/1; 318/572

[56] References Cited
UNITED STATES PATENTS

| | | | |
|---|---|---|---|
| 3,073,998 | 1/1963 | Bower................................ | 318/572 |
| 3,270,186 | 8/1966 | Centner............................ | 318/572 X |
| 3,328,655 | 6/1967 | Tripp.................................. | 318/572 X |
| 3,500,150 | 3/1970 | Foster............................. | 235/151.11 X |
| 3,679,955 | 7/1972 | Rhoades........................... | 318/572 |

Primary Examiner—Joseph F. Ruggiero
Attorney, Agent, or Firm—James J. Wood

[57] ABSTRACT

A vector conversion system for a numerical contouring control having a programmed machine path with at least two axial displacements $\Delta X, \Delta Y$, with a given cutter radius RCRAD. Master vector and slave vector computers are provided and arranged to operate in rotation and multiplication modes. The master vector computer receives signals which are a function of $\Delta X$ and $\Delta Y$ and delivers a counter rotational control signal and an RSS signal where $RSS = \sqrt{\Delta X^2 + \Delta Y^2}$. The slave vector computer receives the counter rotational control signal, a "0" signal and a signal which is a function of RCRAD, and delivers output signals IRC and JRC which are the orthogonal components of RCRAD. When these components IRC and JRC are interchanged, in effect, vector RCRAD is normal to the programmed machine path.

12 Claims, 11 Drawing Figures

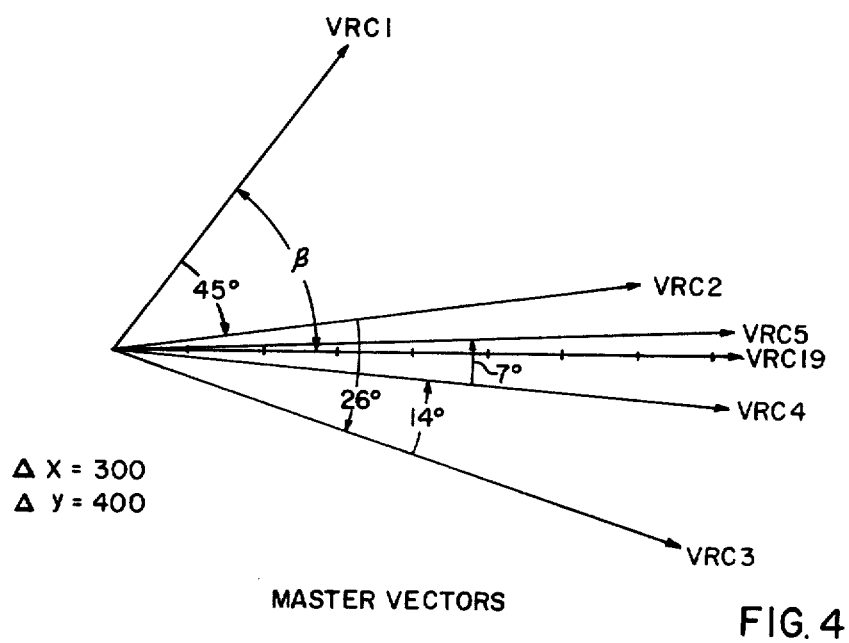
MASTER VECTORS FIG. 4
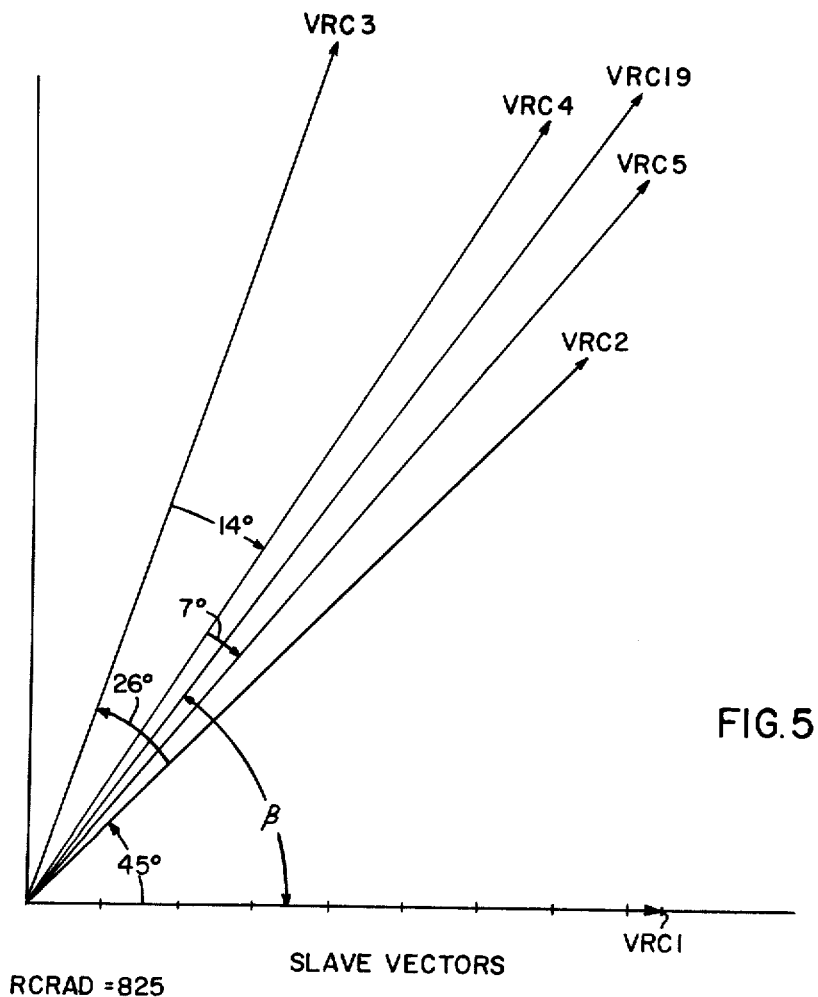
SLAVE VECTORS FIG. 5

| VECTOR ROTATE CYCLE | EXTRA SHIFT PULSES | i | $X_{n+1}$ | $Y_{n+1}$ | ANGLE OF ROTATION $-(\quad)+$ | MODE OF OPERATION |
|---|---|---|---|---|---|---|
| VRC0 | 0 | | | | | REST STATE |
| VRC1 | 0 | 0 | 300 | 400 | | CLEAR & INITIAL |
| VRC2 | 0 | 0 | 700 | +100 | +45° | |
| 3 | 1 | 1 | 750 | -250 | +26.56 | |
| 4 | 2 | 2 | 812.5 | -62.5 | -14.03 | |
| 5 | 3 | 3 | 820.31 | +39.06 | -7.12 | |
| 6 | 4 | 4 | 822.75 | -12.21 | +3.57 | |
| 7 | 5 | 5 | 823.13 | +13.50 | -1.78 | |
| 8 | 6 | 6 | 823.35 | +0.64 | +0.89 | |
| 9 | 7 | 7 | 823.35 | -5.79 | +0.44 | ROTATE |
| 10 | 8 | 8 | 823.37 | -2.57 | -0.22 | |
| 11 | 9 | 9 | 823.38 | -0.97 | -0.11 | |
| 12 | 10 | 10 | 823.38 | -0.16 | -0.05 | |
| 13 | 11 | 11 | | | | |
| 14 | 12 | 12 | | | | |
| 15 | 13 | 13 | | | | |
| 16 | 14 | 14 | | | | |
| 17 | 15 | 15 | | | | |
| 18 | 16 | 16 | | | | |
| 19 | 17 | 17 | | | | |
| 20 | 1 | | | | | |
| 21 | 3 | | | | | |
| 22 | 1 | | | | | |
| 23 | 2 | | | | | |
| 24 | 1 | | | | | |
| 25 | 2 | | | | | MULTIPLY |
| 26 | 1 | | | | | |
| 27 | 1 | | | | | |
| 28 | 2 | | | | | |
| 29 | 2 | | OUTPUT AT VRC29 AND T3 TIME | | | |

FIG. 6

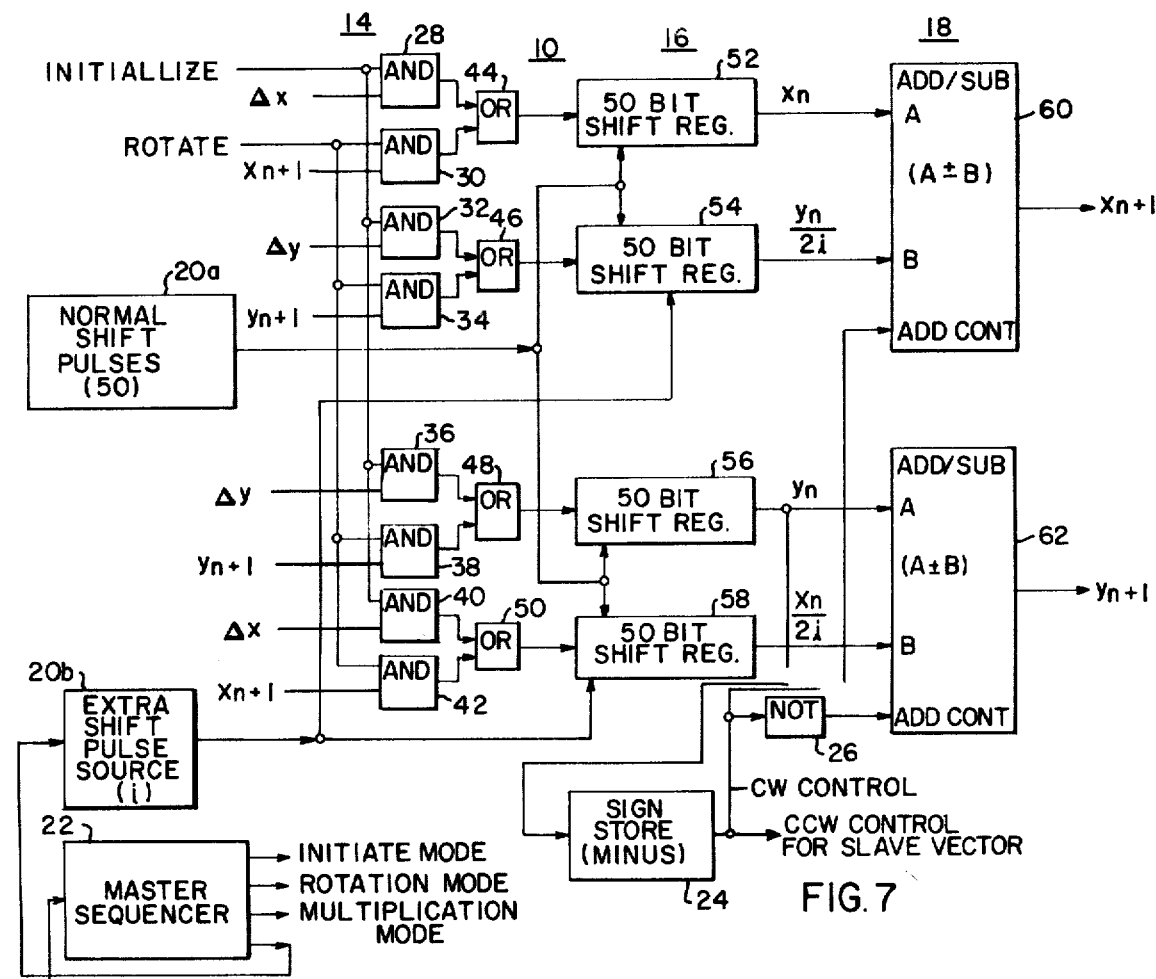
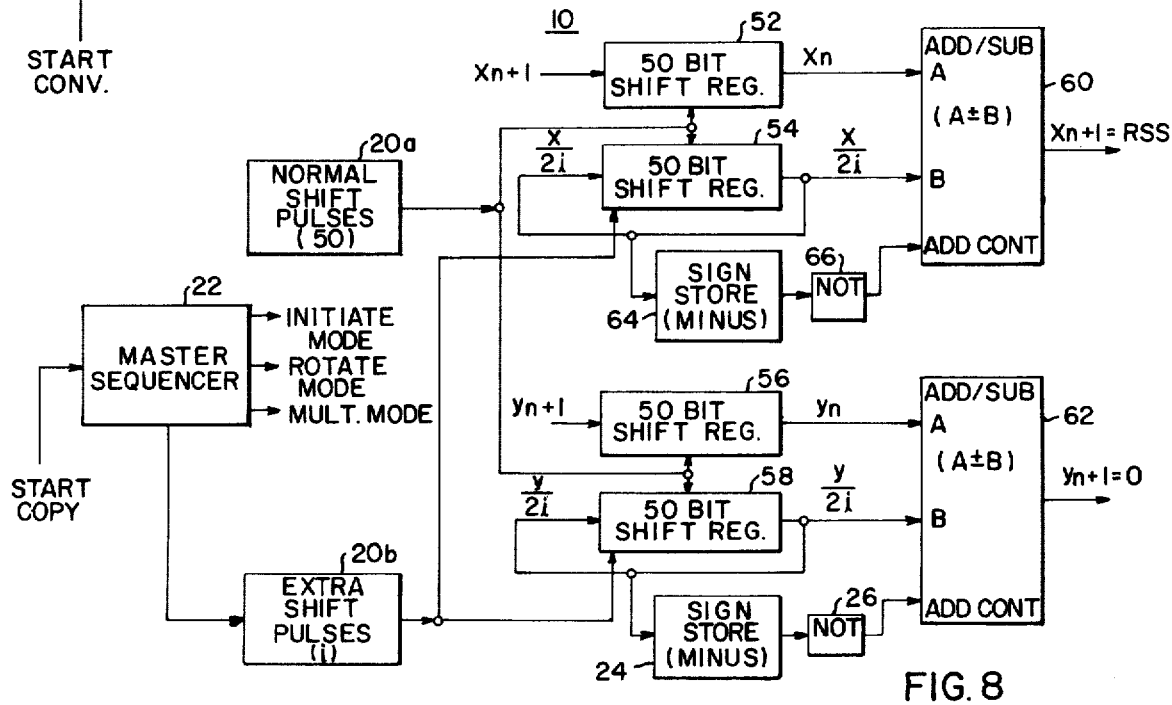
FIG. 7
FIG. 8

VECTOR CONVERSION SYSTEM

CROSS REFERENCE TO RELATED APPLICATION

See copending application entitled "Programmable Digital Frequency Multiplication System with Manual Override" Ser. No. 392,696 filed on Aug. 29, 1973 in the names of Charles A. Lauer and Francis A. Fluet now U.S. Pat. No. 3,916,175.

BACKGROUND OF THE INVENTION

1. Field of the Invention

This invention relates to the rotational manipulation of vectors for utilization in a numerical contouring control system.

2. Description of the Prior Art:

With the advent of new techniques in the field of numerical control, the desired machine path velocity may now be programmed in direct speed dimensions. A digital pulse rate or frequency is generated which represents the desired velocity. This frequency may be identified as the vector frequency Fv. The exactitude of this frequency (Fv) for the purpose intended, depends directly upon the accuracy realized in the calculation of the desired vector displacement. Since the magnitude of this displacement must be continuously calculated in real time, various solutions have been proposed, the accuracy of the results obtained being compromised in the interests of celerity. The instant invention proposes a new solution to the calculation of vector displacements.

Additionally, the present invention provides a solution to the problem of cutter radius compensation to enable flexibility of operation. Obviously, if the programmer's instructions are based upon a fixed cutter radius, the machine operator will have to make some adjustments if he is using a cutter of a different radius.

It has been proposed to merely program the machine path and permit the operator to make compensation for the cutter size to be used. The present invention provides a solution for cutter radius compensation, so that adjustments can be quickly consummated to produce an accurate machine finish along the programmed path.

SUMMARY OF THE INVENTION

A vector conversion system is disclosed for a numerical contouring control having a programmed machine path with at least two axial displacements $\Delta X$, $\Delta Y$ with a given cutter radius RCRAD. Means are provided for master vector rotation and multiplication, the master vector means receiving signals which are a function of the displacements $\Delta X$ $\Delta Y$, and delivering a counter rotational control signal and a RSS signal where RSS = $\sqrt{\Delta X^2 + \Delta Y^2}$.

Means for slave vector rotation and multiplication are provided; the slave vector means receiving said counter rotational control signal and input signals which are functions of 0 and RCRAD respectively. The slave vector means delivers signals IRC and JRC which are the orthogonal components, of RCRAD which components, when interchanged, position RCRAD normal to said programmed machine path.

DESCRIPTION OF THE DRAWINGS

FIG. 4 is a vector diagram illustrating successive master vector rotation for a hypothetical case;

FIG. 5 is a vector diagram illustrating successive slave vector rotation for the same hypothetical case;

FIG. 6 is a table showing some magnitudes involved in the vector conversion cycle for a master vector in the rotation and multiplication modes;

FIGS. 7 and 9 are schematic diagrams showing the master and slave vector converters for the initialization and rotation modes respectively;

FIGS. 8 and 10 are diagrams respectively showing the master and slave vector converters for the multiplication modes respectively.

GENERAL DESCRIPTION

Improved techniques for numerical controls now permit programming the desired machine path velocity in direct speed dimensions. For example, an F character followed by five digits may be used to set the machine speed from 000.01 to 999.99 inches per minute (IPM). The F value is modal, meaning that it is used until a new number is programmed.

In general, the programmed and manually selected parameters are used to generate a digital pulse rate or frequency which represents the desired velocity. This frequency will be called the vector frequency Fv.

The copending application entitled "Programmable Digital Frequency Multiplication System with Manual Override", Ser. No. 392,696, filed on Aug. 29, 1973, in the names of Charles A. Lauer and Francis A. Fluet, now U. S. Pat. No. 3,916,175, describes a digital frequency multiplication system for generating a pulse rate or the frequency Fv, which is a function of the machine velocity, and then deriving the component frequencies representative of the machine velocity, along at least two orthogonal reference axes. Typically each Fv pulse represents one increment usually 0.0001 inch of vector or machine path motion. Further processing of the Fv pulses provides the frequencies Fx and Fy to control the respective velocities along the orthogonal axes $x$ and $y$ (motion along the $z$ axis may also be controlled in three dimensional situations, but in the interests of simplicity, this discussion will be confined to the $x-y$ plane).

In deriving the components Fx and Fy, the copending application of Lauer and Fluet cited supra, calculates the term RSS, i.e., the number derived from:

$$\text{RSS} = \sqrt{\Delta x^2 + \Delta y^2} \quad (1)$$

The vector length RSS is an acronym derived from Root of Sum of Squares). The velocity accuracy is proportional to the accuracy of RSS with respect to the true vector length. The RSS calculation using the given $\Delta x$ and $\Delta y$ magnitudes need only be done once before the frequency multiplication process starts. The calculation RSS is performed once for each move programmed.

In order to provide greater flexibility for the user of numerical controls, the motion of the machine is programmed without taking into account the radius of the cutting tool (RCRAD), leaving cutter radius compensation (CRC) to be accomplished by the machine tool operator at the situs of operation. In practice the magnitude RCRAD is supplied as an input to the numerical control system by the machine operator through a manual data input device. The displacement commands for machine motion must therefore be offset by a magnitude equal to the cutter radius (RCRAD).

The invention to be described provides for CRC and additionally RSS is calculated with greater accuracy than heretofore attained.

Figure 1:
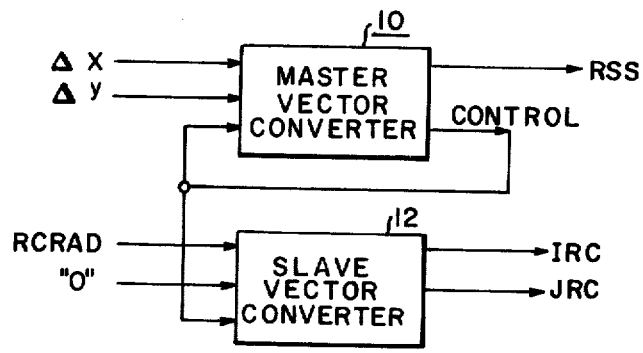
FIG. 1 is a block diagram showing the masterslave vector conversion system in accordance with the invention.
Figure 2:
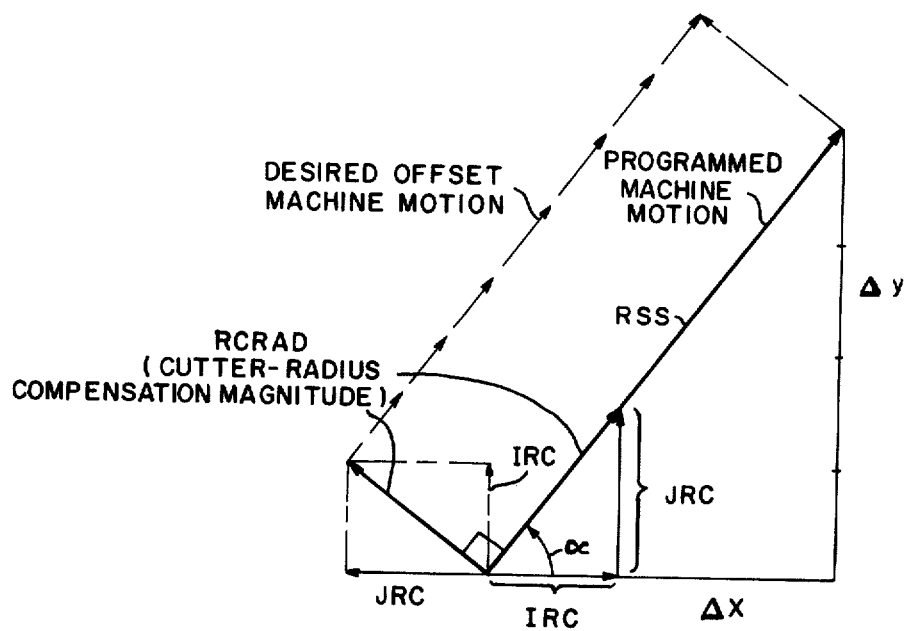
FIG. 2 is a diagram used in explaining the invention and depicting the inter-relationship between the various vector components utilized in the inventive concept.

For an overview of the invention, reference will now be had to FIGS. 1 and 2. Two coordinating rotating digital computers indicated generally at 10, 12 operate in a master-slave configuration respectively. The master unit 10 accepts the stored axis departures $\Delta X$, $\Delta Y$ and calculates the RSS vector magnitude. During this calculation of RSS, the slave unit 12 accepts the RCRAD magnitude, and using control signals from the master unit 10, calculates the rectangular coordinates IRC and JRC such that:

$$\text{IRC} = \text{RCRAD} \cdot \cos(\tan^{-1}[\Delta Y/\Delta X]) \quad (2)$$
$$\text{JRC} = \text{RCRAD} \cdot \sin(\tan^{-1}[\Delta Y/\Delta X]) \quad (3)$$

As may be seen best from a study of FIG. 2, when the coordinates IRC and JRC are interchanged with respect to the orthogonal axes, i.e., JRC is laid off along the X-axis, and IRC is laid off along the Y-axis, then the resultant (RCRAD) is normal to the vector captioned: "Programmed Machine Motion."

In order to appreciate the rationale upon which the vector conversion is based, a brief review of the Cordic Mathematics is in order.

MATHEMATIC BACKGROUND

The invention to be described makes use of the CORDIC algorithm which is described in the following references: "Decimal-Binary Conversions in CORDIC," D. H. Daggert IRE Transactions on Electronic Computers, EC8 September, 1959, pp. 335–339; "CORDIC Trigonometric Computing Technique," J. E. Valder, IRE Transactions on Electronic Computers, LSC-8 September, 1959, at pp. 330–334; and "Use Decimal CORDIC for Generation of Many Transcendental Functions," H. Schmid and A. Bogacki, EDN, Feb. 20, 1973, pp. 64–73.

Figure 3:
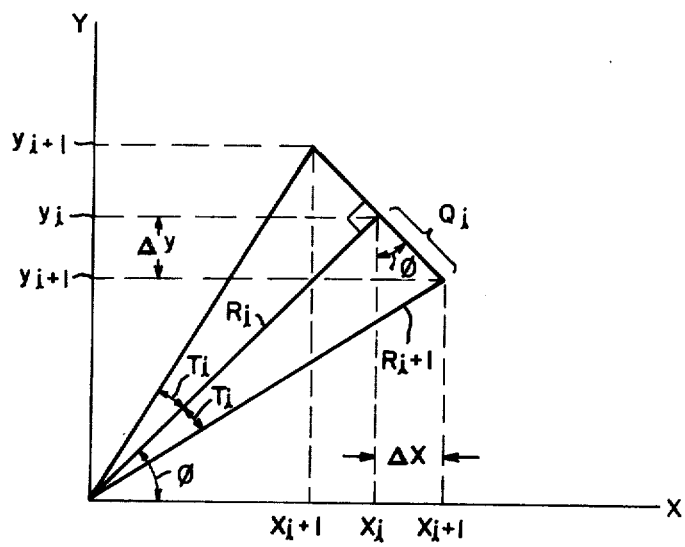
FIG. 3 is a vector diagram used in explaining the CORDIC algorithm.

Referring now to FIG. 3, the basic CORDIC equations can be used in an iterative way to rotate a vector $Ri$ through some angle $\phi$:

$$X_{i+1} = X_i \pm 2^{-i} Y_i \quad (4)$$
$$Y_{i+1} = Y_i \mp 2^{-i} X_i \quad (5)$$

Proof

By definition let:

$$T_i = \tan^{-1}(2^{-i}) = \tan^{-1}(Q_i)/(R_i) \quad (6)$$
$$\therefore 2^{-i} = Q_i/R_i \text{ (as } i \to \infty \; T_i \to 0\text{)} \quad (7)$$
$$\Delta X = Q_i \sin\phi \quad \Delta Y = Q_i \cos\phi \quad (8)$$
$$X_{i+1} = X_i \pm \Delta X \quad Y_{i+1} = Y_i \mp \Delta Y \quad (9)$$
$$X_{i+1} = X_i \pm Q_i \sin\phi \quad Y_{i+1} = Y_i \mp Q_i \cos\phi \quad (10)$$
$$X_{i+1} = X_i \pm R_i 2^{-i} \sin\phi \quad Y_{i+1} = Y_i \mp R_i 2^{-i} \cos\phi \quad (11)$$
$$X_{i+1} = X_i \pm R_i 2^{-i} Y_i/R_i \quad Y_{i+1} = Y_i \mp R_i 2^{-i} X_i/R_i \quad (12)$$
$$X_{i+1} = X_i \pm 2^{-i} Y_i \quad Y_{i+1} = Y_i \mp 2^{-i} X_i \quad (13)$$

The vector can be rotated through any angle ($0 \geq \theta \geq 90°$) by choosing the direction of each $T_i$ such that:

$$\theta = \sum_{i=0}^{n} T_i \quad (14)$$

Since $T_i$ approaches 0 very rapidly, only a limited number of iterations ($n$) are required for excellent accuracies. For example, after only 18 iterations $T_{17} = \tan^{-1} 2^{-17} = 0.000437°+$ $$R_{i+1} = (X_{i+1}^2 + Y_{i+1}^2)^{1/2} \quad (15)$$
$$R_{i+1} = \{(X_i \pm 2^{-i}Y_i)^2 + (Y_i \mp 2^{-i}X_i)^2\}^{1/2} \quad (16)$$
$$R_{i+1} = [(X_i^2 + Y_i^2)(1 + 2^{-2i})]^{1/2} \quad (17)$$

$$\frac{1}{\cos T_i} = (1 + 2^{-2i})^{1/2} \quad (18)$$

$$R_{i+1} = R_i \frac{1}{\cos T_i} \quad (19)$$

Thus from (16) it can be seen that each rotation causes the vector to elongate by the factor $1/\cos T_i$.

Therefore after a fixed number of iterations the percentage growth of the vector is known:

$$\frac{N}{\pi} \left( \frac{1}{\cos T_i} \right) \quad (20)$$

or $$i = 0$$
$$N/\pi (1 + 2^{-2i})^{1/2} \quad (21)$$

and $$i = 0$$

it is only necessary to multiply the rotated vector by the inverse to find the true length.

For $N=17$ $17/\pi (1 + 2^{-2i}) = 1.646760+$ (22)
$$i = 0$$

In order to provide a quantitative appreciation of the master slave vector rotations consideration will now be given to the hypothetical example depicted in FIGS. 4, 5 and in the table of FIG. 6.

Assume that $\Delta X = 300$, $\Delta Y = 400$ and that RCRAD = 825.

For convenience, the equations of (13) will be changed to the forms given in equations 23 and 24 below:

$$X_n + 1 = X_n \pm Y_n/2^i \quad (23)$$
$$Y_n + 1 = Y_n \mp X_n/2^i \quad (24)$$

where the variable $n$ represents a particular Vector Rotator Cycle Time (FIG. 6: VRC2 through VRC19) and $n + 1$ represents the next Vector Rotator Cycle Time. Further, as may be seen from the table of FIG. 6, the exponent $i$ of radix 2 is the number of extra shift pulses generated.

The plus or minus options in equations (23) and (24) determine the direction of angular change viz. clockwise (CW) or counterclockwise (CCW). The direction of the $n + 1$ angular change is determined by the polarity of the Y components after the $n$ angular change.

At VRC2, the coordinates for the master vector are obtained from equations (23) and (24). (The coordinates for the slave vector are similarly obtained, but only those for the master vector will be calculated.

$$X_n + 1 = 300 + 400/2^0 \quad (25)$$
$$X_n + 1 = 700$$
$$Y_n + 1 = 400 - 300/2^0 \quad (26)$$
$$Y_n + 1 = 100$$

As shown in FIG. 4, the master vector rotates from the initial position (VRC1), 45° CW to the position VRC2. At the same time, (FIG. 5) the slave vector rotates 45° CCW from VRC1 to VRC2.

The process continues:

$$X_n + 1 = 700 + 100/2^1 \quad (27)$$
$$X_n + 1 = 750$$
$$Y_n + 1 = 100 - 700/2^1 \quad (28)$$
$$Y_n + 1 = 100 - 350$$
$$Y_n + 1 = -250$$

The master vector now rotates 26.56° CW from the position VRC2 (FIG. 4) to the position VRC3. Similarly, the slave vector rotates 26.56° CCW from the position VRC2, FIG. 5 to the position VRC3.

The process continues VRC3 – VRC19, at which time the master vector is substantially at 0° (i.e. in FIG. 4 the angle $\beta$ has been successively reduced to zero degrees), and the slave vector is substantially at $\beta°$ (i.e., in FIG. 5 the angle 0° has been successively increased in step when the master vector decreases, until the vector is at the angle $\beta$). Actually, as may be seen from a study of FIG. 6, the angle of rotation is very nearly zero from VRC8 on.

At the end of VRC19, that is seventeen iterations, the master and slave vectors are as shown in FIGS. 4 and 5 respectively.

As shown by equation 22 after 17 iterations the overall vector growth is:
$K = 1.646760^+$ Thus, both the master and slave vectors are $K$ times longer than their initial vector magnitudes. In order to compensate for this, the resulting vectors are multiplied by approximately:
$1/K = 0.607252935^+$ This is accomplished during the vector rotate cycles VRC20 – VRC 29.

PRACTICAL EMBODIMENT

One hardware implementation of the invention is shown in FIGS. 7, 8, 9, 10.

The invention operates in three modes: (a) initialization (b) rotation and (c) multiplication. In order to simplify the explanation of the embodiment, the initialization and rotation modes for the master and slave vector conversions are separately shown in FIGS. 7 and 9, while the multiplication mode for the master and slave vector conversions are depicted in FIGS. 8 and 10 respectively. It should of course be understood that in the practical embodiment the various modes are realized with the same components and that, whenever possible, logic elements are consolidated to avoid duplication and maximize efficiency.

Referring now specifically to FIG. 7, the master vector converter 10 may be conveniently divided into logic circuitry indicated generally at 14, a plurality of shift registers identified generally at 16, and full adder-subtractors identified generally at 18. A source of shift pulses (normal) is identified at 20a and a source of extra shift pulses (i) is identified at 20b. A master sequence unit is shown symbolically at 22. Completing this generalized description, a sign store and a NOT logic element are identified at 24 and 26 respectively.

The logic circuitry 14, for example, may comprise AND gates 28, 30, 32, 34, 36, 38, 40, 42, OR gates 44, 46, 48, and 50.

The plurality of shift registers identified generally at 16 comprises 50 bit shift registers identified at 52, 54, 56, and 58.

Finally, the full adder-subtractor means 18 comprises full adder-subtractors 60, 62.

In FIG. 8, the master vector rotator 10 is shown in skeletonized form in the interests of simplicity. The logic circuitry 14 has been eliminated, and a sign store 64 and a NOT element 66 has been added.

Figure 9:
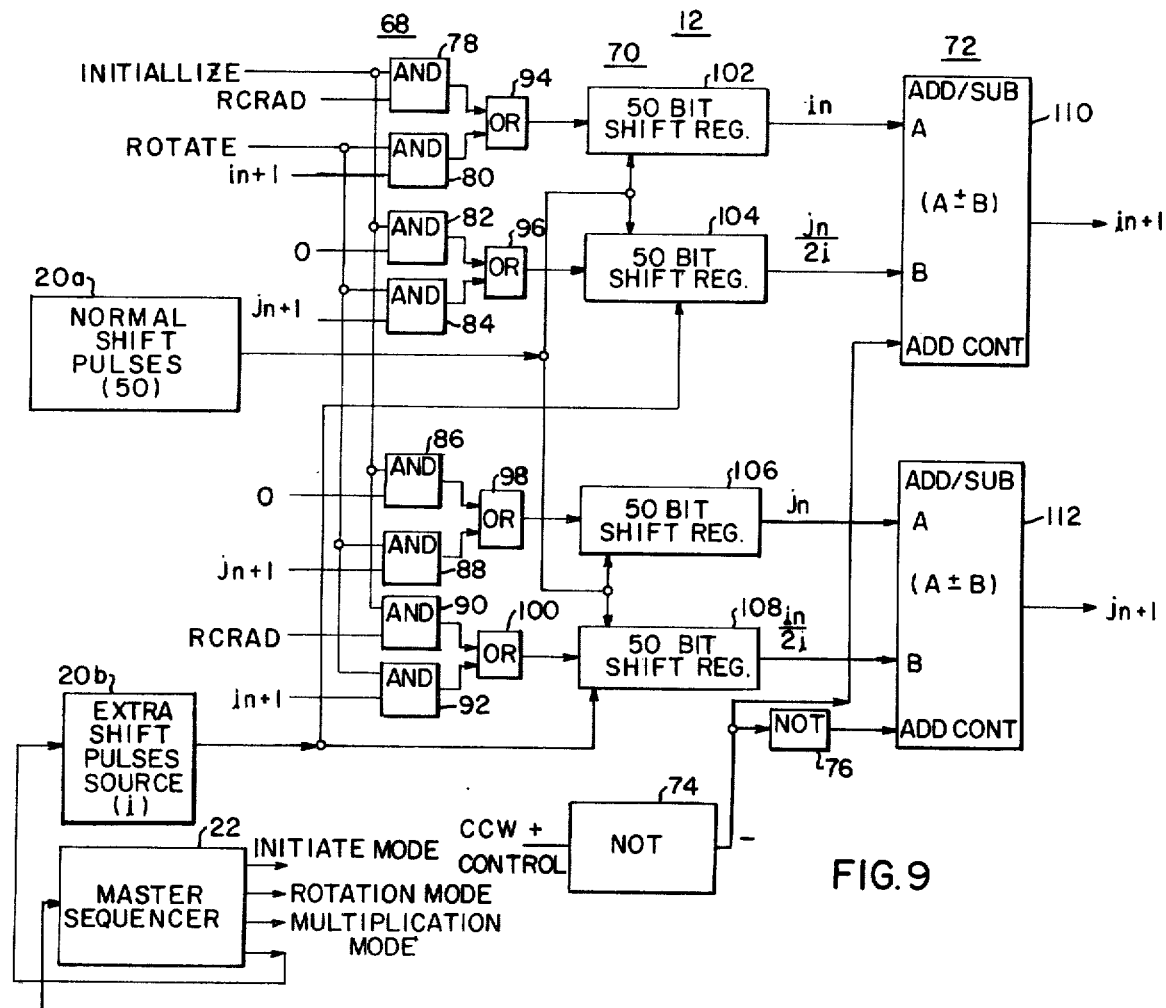
Figure 10:
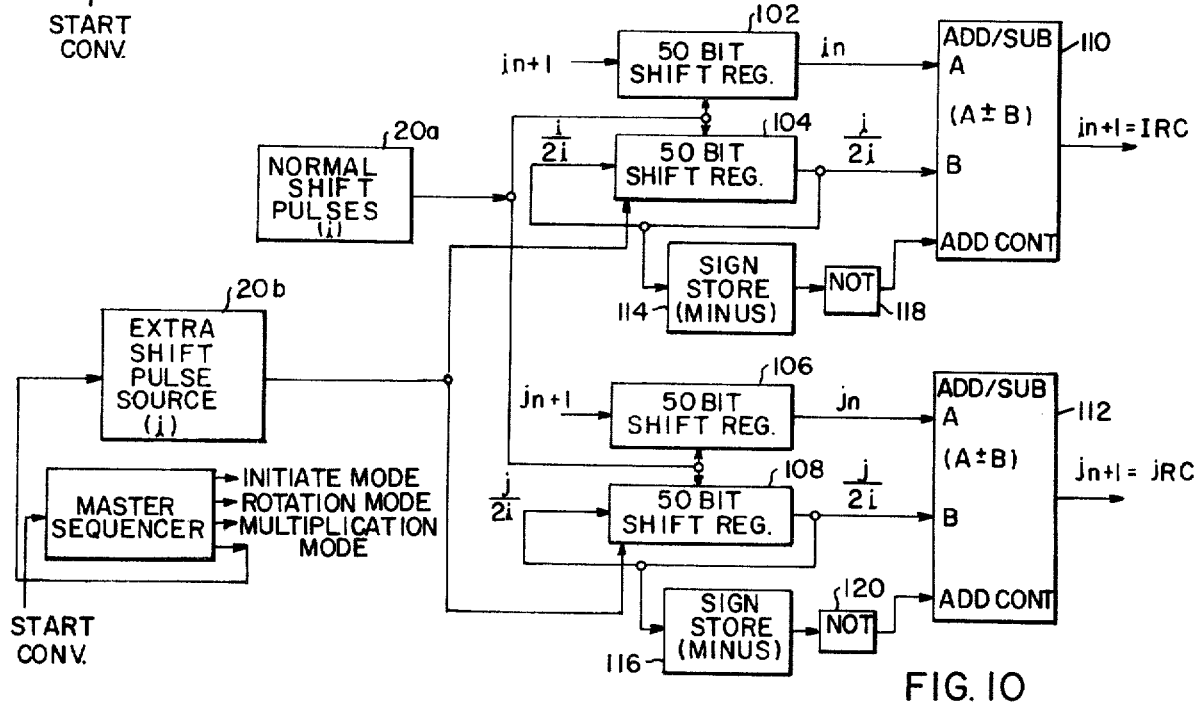

The slave vector rotator 12 is depicted in the initialization and rotation modes, FIG. 9 and in the multiplication mode in FIG. 10.

Referring now to FIG. 9, the slave vector rotator 12 may be conveniently divided into logic circuitry indicated generally at 68, a plurality of shift registers identified generally at 70, and full adder-subtractors identified generally at 72. The source of shift pulses (normal) is identified at 20a and the source of extra shift pulses (i) is identified at 20b. Completing this generalized description, NOT logic elements are identified at 74 and 76.

The logic circuitry 68 for example may comprise AND gates 78, 80, 82, 84, 86, 88, 90, 92 and OR gates 94, 96, 98, and 100.

The plurality of shift registers identified generally at 70 comprises 50 bit shift registers 102, 104, 106, and 108.

The full adder-subtractor means 72 comprises full adder-subtractors 110 and 112.

In FIG. 10, the slave vector rotator 12 is also shown in skeletonized form in the interests of simplicity. Logic circuitry 68 has been eliminated. Sign store means are identified at 114 and 116, and NOT logic gates are identified at 118 and 120.

In the discussion to follow, only the master vector rotator will be discussed in the interests of simplicity since it will then be obvious that the slave vector rotator operates in the same manner.

Figure 11:
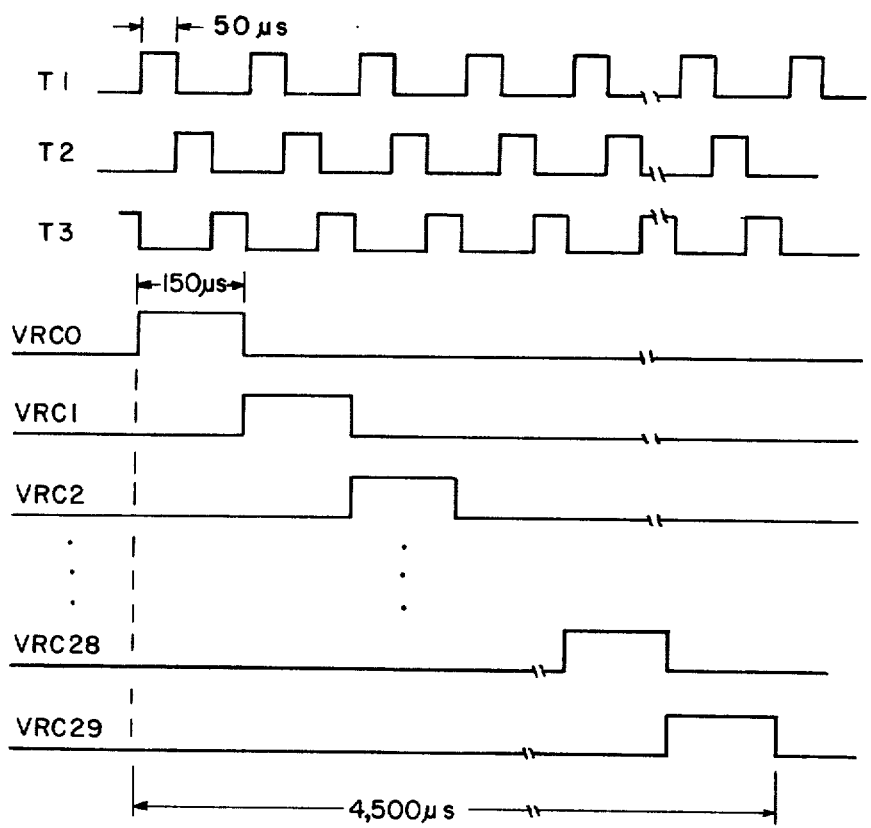
FIG. 11 is a timing diagram used in explaining the operation of the master and slave vector converters.

We shall now discuss the initialization and rotation modes of the master vector rotator shown in FIG. 7; reference will also be had to the table shown in FIG. 6 and to the vector rotating timing waveforms shown in FIG. 11.

In general, the vector converters use arithmetic format, that is, serial, binary, two's complement, with static shift registers as the data storage element. The static form of shift register insures that when shifting stops the data is retained and is not lost as would occur in dynamic shift registers.

The timing chart for vector rotation control is shown in FIG. 11. It comprises three states (shown at T1, T2 and T3), which identify three 50$\mu$ second periods of time occurring during each Vector Rotator Cycle, i.e., VRC0 through VRC29.

In general, the T1 time is reserved for generating extra shift pulses to the shift registers 54, 58, controlled by the extra shift pulse (i) control 20b. Each shift pulse causes the shifted register contents to be divided by two, with respect to all other registers. In view of the fact that the shifting operation could cause a truncation error or loss of the least significant bits of the original 25 bit data word, fifty bit registers are utilized with the "binary point" in the middle of the 50 bits, that is, the 25 least significant bits carry along the fractional part of the intermediate calculations to improve accuracy.

The T2 and T3 periods are used to generate a full shift cycle or iteration of all 50 bit registers. During T2, the fractional portion of the data, least significant bit first, is coming out of the registers. During T3, the whole magnitude or most significant position of the 50 bit data word comes from the register again with the least significant bit first.

The start of conversion is begun by actuating the master sequence 22 which controls the three modes: (a) initialization (b) rotation and (c) multiplication.

INITIALIZATION

The initialization cycle VRC1 (FIG. 6) performs two functions for all the shift registers in the master vector converter 10. During T2 (FIG. 11) when the fractional portion of the register is coming out, zeros are serially loaded into all the registers. During T3, when the whole contents of the registers are being delivered, the initial magnitudes (in our hypothetical case $\Delta X = 300$, $\Delta Y = 400$) are loaded into the registers. More specifically, $\Delta X$ is in the shift registers 52, 58, $\Delta Y$ is in shift registers 54, 56. This prepares all registers for the rotation cycle which begins at VRC2.

The full adder-subtractors 60, 62 essentially perform the operation:

$$X_{n+1} = X_n \pm Y_n/2^i \quad (23)$$
$$Y_{n+1} = Y_n \mp X_n/2^i \quad (24)$$

In the upper portion of FIG. 7 $A = X_n$ and in the lower portion $A = Y_n$. Similarly, $B = Y_n/2^i$ above and $X_n/2^i$ below.

The sign store 24 is a flip flop. As may be seen from a study of FIG. 7, the flip flop stores the sign of the $Y_n$ component for use in the next iteration through the registers. The sign is thus applied: to full adder-subtractor 60; to NOT logic gate 26 and to the slave vector rotator 12 (FIG. 9). The NOT gate 26 is of course an inverter so that when full adder-subtractor 60 performs the operation A+B, the full adder-subtractor 62 performs the operation A−B and conversely.

The extra shift pulse source $(i)$ 20b is provided to perform division and is applied only to registers 54, 58 to deliver $X_n/2^i$ and $Y_n/2^i$ respectively. Each time a shift pulse is applied it is equivalent to division by two since a shift in the contents of a shift register changes the weighted significance.

MULTIPLICATION (FIG. 8)

To recapitulate, at the end of VRC 19, that is at the end of seventeen iterations, the resulting vector magnitude is $K$ times longer than the initial vector magnitude ($K = 1.646760256^+$). To compensate for this, the resulting vector is multiplied by $1/K = 0.6072540283203125$ The binary $0.1001101101110101$ is a good approximation for $1/K$.

In order to realize multiplication by the binary approximation of $1/K$, advantage is taken of the extra shift pulse generating capability during the T1 period of the Vector Rotation Cycle (FIG. 6).

During the last iteration of the rotation mode, in preparattion for the multiplication mode, the inputs to the $X_n$ (52) and $Y_m$ (56) registers are zeroed so that the contents of $X_m$ and $Y_m$ at the end of the rotation mode is zero.

Referring to FIG. 7, the contents of the $X_m/2^i$ and $Y_m/2^i$ (58 and 54) registers contain the final rotated vector components. The $X$ component will be positive, but the $Y$ component may be negative. The Add/Subtract control input of the adders 60, 62 shown in FIG. 8 use the polarity of the $X_m/2^i$ and $Y_m/2^i$ registers to cause the $X_{m+1}$ and $Y_{m+1}$ values to be always positive.

Multiplication by the binary fraction approximately $1/K$ (i.e., $0.1001,1011,0111,0101$) ) can be accomplished by multiplying each final vector component by the sum of the "position weights" of the "ones" in the binary fraction. For example:

$$Z/K = Z(2^{-1} + 2^{-4} + 2^{-5} + 2^{-7} + 2^{-8} + 2^{-10} + 2^{-11} + 2^{-12} + 2^{-14} + 2^{-16}) \quad (29)$$

where $Z$ is either the $X$ or $Y$ component.

$$Z/K = Z2^{-1} + Z2^{-4} + Z2^{-5} + Z2^{-7} + Z2^{-8} + Z2^{-10} + Z2^{-11} + Z2^{-12} + Z2^{-14} + Z2^{-16}. \quad (30)$$

However, the last equation above can be more easily implemented using the four registers of FIG. 8 to perform:

$$Z/K = (Z)2^{-1} + (Z2^{-1})2^{-3} + (Z2^{-4})2^{-1} + (Z2^{-5})2^{-2} + (Z2^{-7})2^{-1} + (Z2^{-8})2^{-2} + (Z2^{-10})2^{-1} + (Z2^{-11})2^{-1} + (Z2^{-12})2^{-2} + (Z2^{-14})2^{-2} \quad (31)$$

This sum of product terms equation is implemented during the ten VRC cycles, VRC20 through VRC29.

During each of the ten cycles, one of the product terms in the equation (31) is generated at the output of the $X/2^i$ register, by using the extra shift pulse capability, starting with the $Z2^{-1}$ term. The number of extra shift pulses needed to generate the term is determined by the exponent of 2 outside the parantheses, in that term. The successive magnitudes for these extra shift pulses are listed in FIG. 6 during the multiplication Cycle. The $X_m$ register is used to accumulate each term generated by the $X/2^i$ register during each iteration of the multiplication mode producing the sum of product terms. The operation of the respective registers is the same for the other vector components in both the Master and the Slave Vector Converters. The result of the multiplication cycle can then be taken at the output of the adders during the final step of multiplication (VRC29) or it can be taken at the output of the $x_m$ register during VRC30. The resultant magnitudes, after the multiplication cycle are:

| Register | | Initial Value | Final Value |
|---|---|---|---|
| MASTER | $X_n$ | $\Delta X$ | RSS |
| " | $Y_n/2^i$ | $\Delta Y$ | ~0 |
| " | $Y_n$ | $\Delta Y$ | ~0 |
| " | $X_n/2^i$ | $\Delta X$ | ~0 |
| SLAVE | in | RCRAD | IRC |
| " | $j_n/2^i$ | 0 | ~0 |
| " | $j_n$ | 0 | JRC |
| " | $i_n/2^i$ | RCRAD | ~0 |

For the specific implementation described herein, the calculations are in 50 bit (double precision of 25 bit input words) serial binary registers at a bit rate of 500 kilobits/sec.

The calculation process takes 4.5 milliseconds and the resultant RSS accuracy is +2, −0 PPM. The accuracy of IRC and JRC is about ± 8 PPM.

Many variations of the vector converter are possible. In general, speed of rotation can be sacrificed for increased accuracy, that is the vector rotate iterations could be reduced from eighteen to some lesser number, and the multiplication cycle could be performed in fewer steps; additionally, the register size could be reduced with resulting diminution in accuracy, but an increase in conversion speed.

Additional logic could be provided to perform a full 360° vector rotation instead of the 90° in the illustrative embodiment.

The same circuitry may be used to calculate SINE and COSINE of an angle by forcing the initial conditions of RCRAD to be 1.0 resulting in IRC, JRC values equal to the COSINE and SINE of the angle specified by the $\Delta X$ and $\Delta Y$ initial magnitudes.

I claim:

1. A vector conversion digital system for a numerical contouring control having a programmed machine path with at least two axial displacements $\Delta X$, $\Delta Y$, with a given cutter radius RCRAD, the vectoral conversions being consummated prior to the incremental commanded displacement of said cutter, comprising:

a. means for master vector rotation and multiplication for receiving signals which are a function of said displacements $\Delta X$, $\Delta Y$, and for delivering a counter rotational control signal, and an RSS signal where:

$$RSS = \sqrt{\Delta X^2 + \Delta Y^2} \text{ and}$$

b. means for slave vector rotation and multiplication connected to receive said counter rotational control signal, and input signals which are 0 and a function of RCRAD respectively, and for delivering output signals IRC and JRC which are the orthogonal components of RCRAD, which components, when interchanged, position RCRAD normal to said programmed machine path.

2. A vector conversion system according to claim 1 wherein in the master vector means, a vector Ri having coordinates $Xi = \Delta X$; $Yi = \Delta Y$, during the rotation mode is rotated through an arbitrary angle $\theta$ where $(0 \geqslant \theta \geqslant 90°)$, by choosing the direction of $TiTi = \tan^{-1}(2^{-i})$ and $i$ is the iterative step 0, 1, 2, 3 such that $$\theta = \sum_{i=o}^{n} Ti,$$

the new vector being $$Ri + 1 = Ri \frac{1}{\cos Ti},$$

and during the multiplication mode the vector $Rm + 1$ is multiplied by Cos $Tm$, and in the slave vector means during rotation, the vector RCRAD is similarly rotated but in angular rotative steps which are opposite to those in the master slave rotator, and in the multiplied mode the vector RCRAD is multiplied by Cos $Tm$.

3. A vector conversion system according to claim 1 wherein said master vector means comprises:
   a. an extra shift pulse signal source;
   b. a master logic sequence means responsive to a start conversion signal and delivering signals for the initialization, rotation and multiplication modes, and to said extra shift pulse signal source;
   c. a normal shift pulse signal source;
   d. a plurality of shift registers $Xn$, $Yn/2^i$, $Yn$ and $Xn/2^i$, where $i$ is the iterative step $(0, 1, 2, 3, \ldots)$ said normal shift pulse source being connected to all of said shift registers, said extra shift pulse source being connected to said $Yn/2^i$ and $Xn/2^i$ registers;
   e. logic gating means acting in response to said master logic sequence means to deliver the intelligence $\Delta X$, $\Delta Y$ to said shift registers respectively;
   f. first algebraic adder means having inputs A and B connected to said $Xn$ and $Yn/2^i$ registers respectively, and having an output $Xn + 1$;
   g. second algebraic adder means having inputs A and B connected to said $Yn$ and $Xn/2^i$ registers respectively, and having an output $Yn + 1$; and
   h. signal control means connected to said first and second algebraic adder means to determine respectively the algebraic sign of input B for each of said adder means during the rotation and multiplication modes of operation.

4. A vector conversion system according to claim 3 where after a preselected number of iterations $(n)$ the output of said first algebraic adder means is:
$Xn + 1 = Xn \pm Yn/2^n = RSS$, and
the output of said second algebraic adder means is:
$Yn + 1 = Yn \pm Xn/2^n = 0$ 5. A vector conversion system according to claim 1 wherein said slave vector means comprises:
   a. an extra shift pulse signal source;
   b. a master logic sequence means responsive to a start conversion signal and delivering signals for the initialization, rotation and multiplication modes, and to said extra shift pulse signal source;
   c. a normal shift pulse signal source;
   d. a plurality of shift registers in, $jn/2^i$, $jn$ $in/2^i$, where $i$ is the iterative step 0, 1, 2, 3, ..., said normal shift pulse signal source being connected to all of said shift registers, said extra shift pulse source being connected to said $jn/2^i$ and $in/2^i$ registers;
   e. logic gating means acting in response to said master logic sequence means to deliver the intelligence 0 and RCRAD to said shift registers respectively;
   f. first algebraic adder means having inputs A and B connected to said $i_n$ and $jn/2^i$ registers and having an output $i_n + 1$;
   g. second algebraic adder means having inputs A and B connected to said $j_n$ and $in/2^i$ registers, and having an output $jn + 1$, and
   h. sign control means connected to receive said counter rotational control signal and connected to said first and second algebraic adder means to determine respectively, the algebraic sign of input B for each of said adder means during the rotation and multiplication modes of operation.

6. A vector conversion system according to claim 5 wherein after a preselected number of iterations $(n)$ the output of said first algebraic adder means is:
$i_{n+1} = i_n \pm jn/2^n = IRC$
and the output of said second algebraic adder means is:
$j_{n+1} = j_n \mp in/2^n = JRC$ 7. A vector conversion system according to claim 3 wherein in the multiplication mode $Z \cos Tn =$
(Z) $2^{-1}$ +
(Z $2^{-1}$) $2^{-3}$ +
(Z $2^{-4}$) $2^{-1}$ +
(Z $2^{-5}$) $2^{-2}$ +
(Z $2^{-7}$) $2^{-1}$ +
(Z $2^{-8}$) $2^{-2}$ +
(Z $2^{-10}$) $2^{-1}$ +
(Z $2^{-11}$) $2^{-1}$ +
(Z $2^{-12}$) $2^{-2}$ +
(Z $2^{-14}$) $2^{-2}$ + etc.

where Z is respectively the X and Y components, and the magnitude of the exponent of the 2 outside the parenthesis represents the required number of extra shift pulses, the respective product terms being generated at the output of the $z/2^i$ registers, the Zn register accumulating each term generated by the $Z/2^i$ register.

8. A vector conversion system according to claim 5 wherein in the multiplication mode $Z \cos Tn =$
(Z) $2^{-1}$ +
(Z $2^{-1}$) $2^{-3}$ +
(Z $2^{-4}$) $2^{-1}$ +
(Z $2^{-5}$) $2^{-2}$ +
(Z $2^{-7}$) $2^{-1}$ +
(Z $2^{-8}$) $2^{-2}$ +
(Z $2^{-10}$) $2^{-1}$ +
(Z $2^{-11}$) $2^{-1}$ +
(Z $2^{-12}$) $2^{-2}$ +
(Z $2^{-14}$) $2^{-2}$ + etc.

where Z is respectively the $i$ and $j$ components, and the magnitude of the exponent of the 2 outside the parenthesis represents the required number of extra shift pulses, the respective product terms being generated at the output of the $Z/2^i$ registers, the Zn register accumulating each term generated by the $z/2^i$ register.

9. A vector conversion system according to claim 3 wherein said logic gating means comprises AND and NOT logic elements.

10. A vector conversion system according to claim 5 wherein said logic gating means comprises AND and NOT logic elements.

11. A vector conversion system according to claim 3 wherein said sign control means comprises cooperating flip flops and NOT logic elements, the flip flop detecting the sign of a quantity and the NOT logic elements providing input signal inversion to realize rotation and multiplication.

12. A vector conversion system according to claim 5 wherein said sign control means comprises cooperating flip flops and NOT logic elements, the flip flops detecting the sign of a quantity and the NOT logic elements providing input signal inversion to realize rotation and multiplication.

* * * * *